United States Patent
Lakshman et al.

(10) Patent No.: US 11,036,649 B2
(45) Date of Patent: Jun. 15, 2021

(54) NETWORK INTERFACE CARD RESOURCE PARTITIONING

(71) Applicant: Cisco Technology, Inc., San Jose, CA (US)

(72) Inventors: Ravikiran Kaidala Lakshman, San Jose, CA (US); Tanjore K. Suresh, Fremont, CA (US); Deepak Srinivas Mayya, Fremont, CA (US); Sagar Borikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/374,952

(22) Filed: Apr. 4, 2019

(65) Prior Publication Data

US 2020/0320017 A1  Oct. 8, 2020

(51) Int. Cl.
*G06F 12/1081* (2016.01)
*H04L 12/879* (2013.01)
*G06F 12/1036* (2016.01)
*H04L 12/861* (2013.01)

(52) U.S. Cl.
CPC ...... *G06F 12/1081* (2013.01); *G06F 12/1036* (2013.01); *H04L 49/901* (2013.01); *H04L 49/9068* (2013.01)

(58) Field of Classification Search
USPC ....................................................... 710/56
See application file for complete search history.

(56) References Cited

U.S. PATENT DOCUMENTS

| | | | |
|---|---|---|---|
| 8,386,745 B2 | 2/2013 | Kegel et al. | |
| 9,152,591 B2 | 10/2015 | Galles et al. | |
| 9,424,199 B2 | 8/2016 | Kegel et al. | |
| 9,535,849 B2 | 1/2017 | Kegel et al. | |
| 9,916,257 B2 | 3/2018 | Sankaran et al. | |
| 10,489,207 B2* | 11/2019 | Yu | G06F 9/50 |
| 2005/0091439 A1* | 4/2005 | Mohideen | G06F 12/1009 711/1 |
| 2009/0034548 A1* | 2/2009 | Soni | H04L 49/90 370/412 |

(Continued)

FOREIGN PATENT DOCUMENTS

WO   2017049590 A1   3/2017

*Primary Examiner* — Henry Tsai
*Assistant Examiner* — Aurangzeb Hassan
(74) *Attorney, Agent, or Firm* — Edell, Shapiro & Finnan, LLC

(57) ABSTRACT

Presented herein are techniques enable existing hardware input/output resources, such as the hardware queues (queue control registers), of a network interface card to be shared with different hosts (i.e., each queue mapped to many hosts) by logically segregating the hardware I/O resources using assignable interfaces each associated with a distinct Process Address Space Identifier (PASID). That is, different assignable interfaces are created and associated with different PASIDs, and these assignable interfaces each correspond to a different host (i.e., there is a mapping between a host, an assignable interface, a PASID, and a partition of a hardware queue). The result is that that the hosts can use the assignable interface to directly access the hardware queue partition that corresponds thereto.

20 Claims, 5 Drawing Sheets

(56) References Cited

U.S. PATENT DOCUMENTS

| | | | |
|---|---|---|---|
| 2009/0034549 A1* | 2/2009 | Soni | H04L 49/90 370/412 |
| 2010/0325318 A1* | 12/2010 | Desoli | H04L 49/9036 710/29 |
| 2016/0224474 A1* | 8/2016 | Harriman | G06F 12/1036 |
| 2018/0011651 A1* | 1/2018 | Sankaran | G06F 3/0665 |
| 2018/0129616 A1* | 5/2018 | Liang | G06F 9/5077 |
| 2018/0253377 A1* | 9/2018 | Liang | G06F 12/0802 |
| 2018/0293183 A1* | 10/2018 | Cooray | G06F 13/4068 |
| 2018/0321985 A1* | 11/2018 | Kakaiya | G06F 9/5077 |
| 2019/0107965 A1* | 4/2019 | Deval | G06F 3/0631 |
| 2019/0227801 A1* | 7/2019 | Sankaran | G06F 9/542 |
| 2019/0228145 A1* | 7/2019 | Shanbhogue | H04L 63/0876 |
| 2019/0266101 A1* | 8/2019 | Robinson | G06F 12/0831 |
| 2019/0347125 A1* | 11/2019 | Sankaran | G06F 9/3017 |

\* cited by examiner

NETWORK INTERFACE CARD RESOURCE PARTITIONING

TECHNICAL FIELD

The present disclosure relates to network interface cards.

BACKGROUND

A network interface card (NIC), sometimes referred to as network adapter or network interface controller, is the component (e.g., card or circuit board) of a computing device that is used for communicating with other computing devices over a network. That is, a network interface card is a device that is capable of creating one or more network interfaces and exposes the programming interface for those network interfaces via, for example, Peripheral Component Interconnect Express (PCI-E), to a host. A network interface card includes the electronic circuitry for communication using a specific physical layer and data link layer standard (e.g., IEEE 802.3, IEEE 802.11, etc.). As such, network interface cards can be configured to enable communications over a wired or wireless network.

A virtual network interface card (VNIC), sometimes referred to as virtual network adapter or virtual network interface controller, is the logical or software abstraction of a physical network interface card. That is, a virtual network interface card is a logical instantiation of a network interface with, for example, a PCI-E programming interface exposed to a host. A virtual network interface card allows a host (e.g., virtual machine, container, or other entity) to connect to a network using different protocols and allows data transfer between nodes. A physical network interface card can support multiple virtual network interface cards.

DESCRIPTION OF EXAMPLE EMBODIMENTS

Overview

Figure 1:
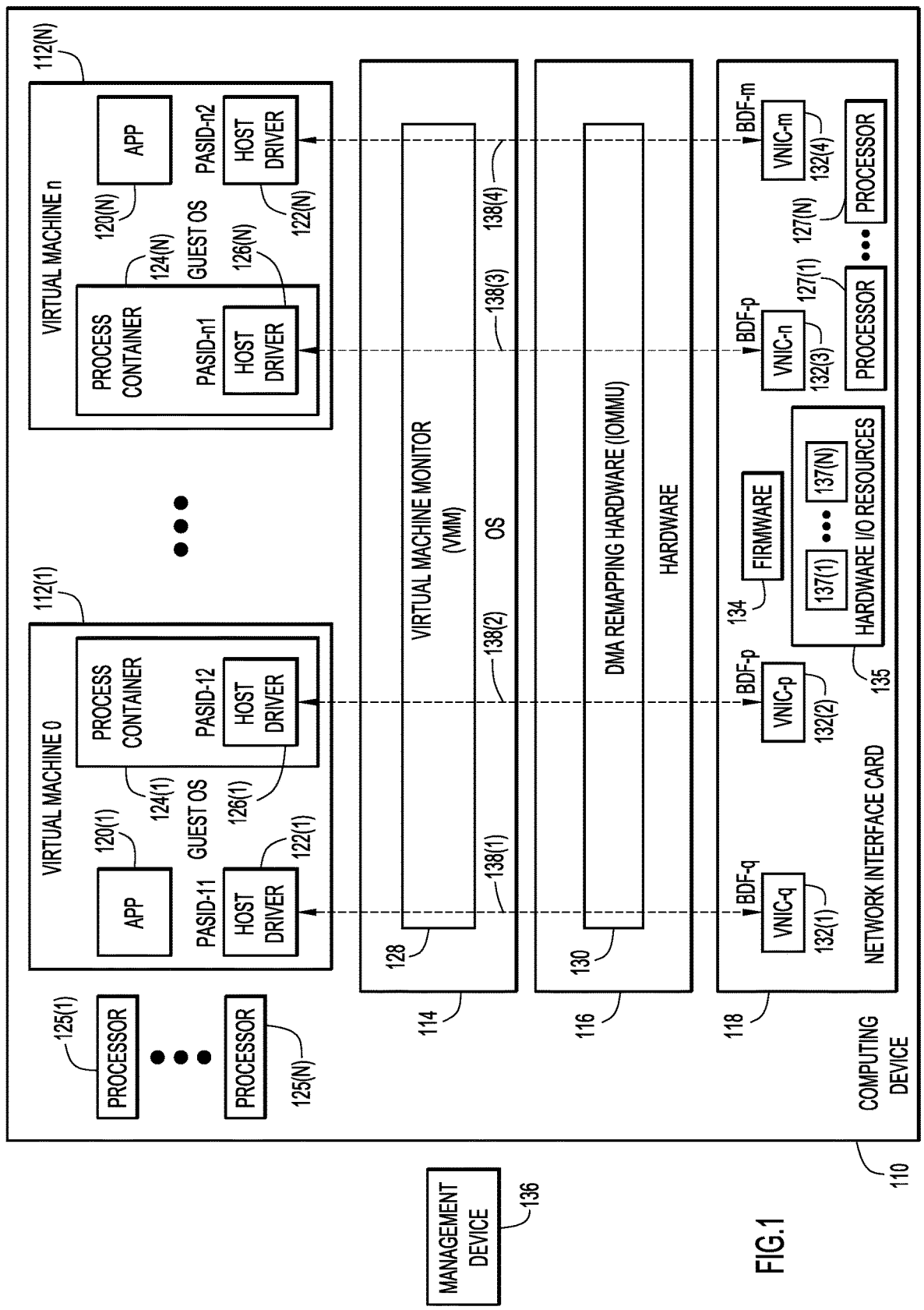
FIG. 1 is a functional block diagram of a computing device having a network interface card configured according to an example embodiment.

Presented herein are techniques enable existing hardware input/output resources, such as the hardware queues (queue control registers), of a network interface card to be shared with different hosts (i.e., each queue mapped to many hosts) by logically segregating the hardware I/O resources using assignable interfaces each associated with a distinct Process Address Space Identifier (PASID). That is, different assignable interfaces are created and associated with different PASIDs, and these assignable interfaces each correspond to a different host (i.e., there is a mapping between a host, an assignable interface, a PASID, and a partition of a hardware queue). The result is that that the hosts can use the assignable interface to directly access the hardware queue partition that corresponds thereto.

EXAMPLE EMBODIMENTS

A computing device generally includes one or more physical network interface cards (NICs) for communication via one or more computer networks. As noted, a physical network interface card can support multiple virtual network interface cards (VNICs), which are logical or software instances enabling a host (e.g., application, virtual machine, container, etc.) to connect to the computer network. Certain network interface cards can be configured to create different "personalities" to achieve converged network traffic flows and to support protocols which can benefit from such converged infrastructure.

For example, certain network interface cards support Peripheral Component Interconnect Express (PCI-E) and enable a policy-based, stateless, agile server infrastructure that can present up to, for example, 256 PCI-E standards-compliant interfaces to a host that can be dynamically configured as either Virtual network interface cards (VNICs) or host bus adapters (HBAs). In certain examples, it is possible to create various personalities on the PCI-E interfaces by allowing the creation of individual config spaces, BAR spaces, and also providing a host the option ROM (when needed per the PCI-E specification). Each of these PCI-E devices can be backed by different varieties of hardware input/output (I/O) resources (acceleration units) at a network interface card, such as Work Queues (WQs), Receive Queues (RQs), and Completion Queues. Network interface cards can also provide a set of interrupt resources which can be dynamically bound to different virtual network interface cards/PCI-E personalities created at the time of boot.

Despite these flexibilities, there are still physical limits on the number of queues and interrupt resources available in a single physical network interface card. As a result, there are also limits on the number of virtual network interface cards that can be created at the physical network interface card. For example, one illustrative physical network interface card is designed to support 512 virtual network interface cards, backed up by 1024 Queues and 2048 interrupt resources. There are also limitations presented by the PCI-E specification limits, namely: Bus (0 . . . 256), device (0 . . . 32), function (0.7) to create that many PCI-E functions. With these resource limitations, conventional physical network interface cards can only scale up to 512 virtual network interface cards and have been designed to support that many hosts (endpoint device) being visible to any operating system (OS) environment, including the system images in a virtualized setup. Moreover, in certain arrangements, other limitations (such as Memory-mapped input/output (MMIO) aperture availability, co-existing with other PCI-E devices in a system), it may not even able to enable a full configuration of 512 virtual network interface cards.

The above limitations are impediments to the scalable use of virtual network interface cards with virtual hosts, such as containers and virtual machines, which can scale into the thousands. Presented herein are techniques that break this scaling barrier through the use of Process Address Space Identifiers (PASIDs) in a virtualization enabled physical network interface card architecture. That is, as described further below, through the use of PASID technology coupled with virtualization and direct input/output (I/O) technology, it may be possible to enable a physical network interface card to support potentially thousands of hosts (e.g., virtual machines, containers, etc.), each having an independently associated virtual network interface card, without increasing the number of underlying physical hardware I/O resources. As described further below, the techniques presented utilize PASIDs to enable "assignable interfaces," where each assignable interface corresponds to (i.e., is associated with) discrete and defined sections/partitions of, for example, Work Queues, Receive Queues, and Completion Queues without consuming excessive bus/device/function (BDF) resources.

In a conventional software virtualization infrastructure, a Virtual Machine Monitor (VMM) is involved for any network interface card hardware access (e.g., to move the data back and forth between a guest operating (OS) to and the network interface card, and vice versa, using the driver/kernel infrastructure). In this methodology, the whole network interface card is virtualized by software and for every transaction the guest OS initiates, the VMM will participate to complete the transaction requested. In accordance with the techniques presented herein, such interaction can be removed by directly assigning hardware input/output (I/O) resources of the network interface card (e.g., network interface card queues) to the guest OS and allowing the guest OS, or even a process within a guest OS, to access the hardware I/O resources with minimal interaction with the VMM.

As described further below, the techniques presented herein enable existing hardware I/O resources, such as the hardware queues (queue control registers), of a network interface card to be shared with different hosts (i.e., each queue mapped to many hosts) by logically segregating the hardware I/O resources using PASIDs. Different assignable interfaces are associated with each PASID, and these assignable interfaces each correspond to a different host (i.e., there is a mapping between a host, an assignable interface, a PASID, and a partition of a hardware queue). The result is that that the hosts can use the assignable interface to directly access the hardware queue partition that corresponds thereto.

FIG. 1 is schematic diagram representing the flow of data in accordance with techniques presented herein where a guest OS gets a direct assignment of input/output (I/O) hardware resources (e.g., queues) of a network interface card, or when a process within the guest OS gets a direct assignment of I/O resources. More specifically, shown in FIG. 1 is a portion of a computing device 110 comprising a plurality of virtual machines 112(1)-112(n), an operating system (OS) 114, a hardware block (hardware) 116, a network interface card (network adapter) 118, and a plurality of processors 125(1)-125(N). As used herein, the term "hardware block" or "hardware" refers to platform hardware of the computing device 10, such as Application-Specific Integrated Circuits (ASICs).

The operating system 114 of the computing device 110 is a piece of software (stored in memory of the computing device) that, when executed one or more of the processors 125(1)-125(N), supports the computing device's basic functions, such as address space isolation to enable more tasks and the guest software (e.g., guest OS or containers), scheduling tasks, executing applications, and controlling peripherals. The operating system 114 includes, among other elements, a Virtual Machine Monitor (VMM) 128, which acts on behalf of hosts and has full control of the processor(s) and other platform hardware. The VMM 128 presents the guest software with an abstraction of a virtual processor and allows it to execute directly on a logical processor. The VMM 128 is able to retain selective control of processor resources, physical memory, interrupt management, and I/O resources. There is a minimal version of a virtual network interface card driver (enic, fnic, snic, rnic, etc.) still integrated as part of the OS or VMM 128, which has been omitted from FIG. 1. These drivers are responsible for initializing the network interface at the PCI-E level and also work to stich the guest OS or process container with assignable interfaces and an enabled PASID.

In the illustrative example of FIG. 1, the virtual machines 112(1)-112(N) include applications (apps) 120(1)-120(N), respectively, associated with host drivers 122(1)-122(N), respectively. The virtual machines 112(1)-112(N) also include process containers (containers) 124(1)-124(N), respectively, associated with host drivers 126(1)-126(N), respectively. The virtual machines 112(1)-112(N) are each sometimes referred to as guest software of a guest operating system (OS) of the computing device 110. In other words, each virtual machine 112(1)-112(N) is a guest software environment that supports a stack consisting of an operating system and application software.

Each virtual machine 112(1)-112(N) operates independently of the other virtual machines and uses the same interface to processor(s), memory, storage, graphics, and input/output (I/O) resources provided by a physical platform. The software stack acts as if it were running on a platform with no VMM. Software executing in a virtual machine 112(1)-112(N) operates with reduced privilege so that the VMM 128 can retain control of platform resources. In the accordance with examples presented herein, the host drivers 122(1)-122(N) are pieces of software which, as described further below, exploit the resources of an assignable interface to achieve the purpose in a guest OS environment or an address space isolated process environment with in guest OS.

The hardware 116 includes, among other elements, Direct Memory Access (DMA) remapping hardware 130, sometimes referred to as an input-output memory management unit (IOMMU). In general, DMA remapping refers to the translation of the address in a DMA request to a host physical address (HPA).

The network interface card 118 is a device that is configured to provide/create a plurality of virtual network interface cards (VNICs) 132 and to expose the programming interface for those network interface cards via PCI-E to the hosts. As such, the virtual network interface cards (VNICs) 132 are each a logical instantiation of a network interface with a PCI-E programming interface exposed to a host. A virtual network interface card 118 could be a general-purpose network interface card configured to run a well-known network stack and associated applications, or it could be a specialized interface which performs and accelerates a specific protocol (e.g., remote direct memory access (RDMA), RDMA over Converged Ethernet version 2 (RoCEv2), Fibre Channel over Ethernet (FCoE), etc.).

For ease of illustration, FIG. 1 only illustrates four (4) virtual network interface cards (VNICs), referred to as VNIC 132(1) (VNIC-q), VNIC 132(2) (VNIC-p), VNIC 132(3) (VNIC-n), and VNIC1 132(4) (VNIC-m) at network interface card 118. However, it is to be appreciated that network interface cards in accordance with examples presented herein, such as network interface card 118, may include/support other (e.g., significantly larger) numbers of VNICs (e.g., potentially thousands of VNICs), through implementation of the techniques presented herein.

The network interface card 118 also one or more processors 127(1)-127(N), firmware 134, and hardware input/output (I/O) resources 135. In general, firmware 134 is a piece of software embedded in the hardware memory of the network interface card executable by, for example, the one or more processors 127(1)-127(N). The firmware 134 is configured to, among other options, provides users with a method to enable the one or more virtual network interface cards and associate/configure the PCI-E resources so that a host could use a virtual network interface card to achieve an intended purpose.

The hardware input/output I/O resources 135 represent hardware resources of the network interface card 118 which, as described further below, can be shared by multiple hosts through the use of assignable interfaces and PASIDs. Merely for purposes of illustration, shown are I/O resources 137(1)-137(N). These I/O resources include queues 137(1)-137(N) may be, for example, posted/fetch index and error registers or queue control registers formed in memory, which include, for example, Work Queues (WQs), Receive Queues (RQs), Completion Queues (CQs), etc. It is to be appreciated that, in practice, hardware input/output resources 135 may include a plurality of different numbers and types of hardware resources.

It is to be appreciated that FIG. 1 is a functional representation of elements of the computing device 110. As such, it is to be appreciated that the logical/functional separations shown in FIG. 1 are merely for purposes of illustration, and do not place a limit on the physical arrangement/structure of the computing device 110. For example, the IOMMU function can be supported by maintaining some address mapping in the network interface card 118. Additionally, FIG. 1 illustrates and refers to different software or firmware elements. As used herein, operations performed by software elements refer to operations performed by one or more of the processors 125(1)-125(N) executing the OS/driver software, which is stored in memory of the computing device 110. The operations performed by firmware refers to operations performed by one or more processors 127(1)-127)N) embedded in the network interface card executing the software, that is stored in the memory of the network interface card 118.

As detailed above, there are physical limits on the number of queues and interrupt resources available in a single physical network interface card. As a result, in conventional arrangements, there are also limits on the number of virtual network interface cards that can be created at the physical network interface card. Therefore, in order to break the scaling barriers of conventional arrangements, the techniques presented herein make use of Process Address Space Identifier (PASID) in a virtualization enabled physical network interface card architecture to create so-called "assignable interfaces (AIs)." In accordance with embodiments presented herein, the assignable interfaces are associated with discrete and defined sections/partitions of hardware input/output (I/O) resources, for example, Work Queues, Receive Queues, and Completion Queues, of a network interface card without consuming excessive bus/device/function (BDF) resources. In this embodiment, an "assignable interface" corresponds to a slim down version of virtual network interface card (VNIC) that is exposed to, for example, the guest OS or to a container, and which is enabled by a host driver to independently function and achieve the purpose for which it is created.

A PASID is a unique identifier used in an OS environment to isolate the process address space used by a guest OS or container environment. The PASID is a key to identifying the DMA translation using paging structures setup by the OS environment. DMA requests with virtual address (or guest virtual address) are tagged with a PASID value that identifies the targeted virtual address space. Typically, a PASID is 20-bit identifier provided by a platform to characterize DMA transactions initiated by the device in order to resolve the physical address properly and to target the transaction to destination memory location. Next generation platforms and OS will be able to support thousands of containers, which is the primary use case for achieving direct IO pass through inside the container without impacting platform resources. As the supported scale increases, it becomes difficult to have those many 1:1 resources mapping of individual Bus/Device/Function (VNIC) for the containers. This inhibits the number of containers a network interface card can support to achieve the pass through. To avoid this, the use of the assignable interfaces as proposed here, each associated with only a portion/partition of the hardware (physical) I/O resources, enable a network interface card to utilize the existing set of hardware I/O resources to support large numbers of containers, virtual machines, or other hosts.

In particular, as noted, conventional arrangements utilize a 1:1 mapping of the VNIC and its associated queues to a given container or guest OS, which limits the scale of pass through on a given device. In contrast, the techniques presented herein use a 1:N mapping of PASIDs, and assignable interfaces, to a given queue (i.e., each queue can support N assignable interfaces, where each assignable interface is associated with a portion of the given queue). As such, the techniques presented herein enable a single queue to be split into multiple queues, and assigned as part of an assignable interface to a guest OS or container. The OS stack assigns a unique PASID for each such assignable interface. An assigned assignable interface is managed by one or more custom device drivers in its appropriate Guest OS or container environment to achieve a purpose using that interface. Thus, the techniques presented herein may support many PASIDs. For example, a queue with 16 K queue depth, could be split into 8 queues with depth of 2K each assigned as part of an assignable interface. The selection of queue depth for the split queue will dictate the scalability achieved in a NIC.

Shown in FIG. 1 are arrows 138(1), 138(2), 138(3), and 138(4), which generally illustrate how device generated DMA transactions are isolated depending on the assignable interface to which a host has been directly assigned, in accordance with the techniques presented herein. In this case, the VMM 128 is not invoked for every transaction generated from guest OS. Instead, the VMM 128 is only invoked to complete some configuration and to perform interrupt management for getting an interrupt to the right domain after assignment of an assignable interface. Such direct assignment of devices to guest OS utilizes complete isolation of DMA from one device to another. Such DMA isolation is provided by the DMA Remapping Hardware 130 using the unique PASID assigned for each such assigned interfaces.

As noted, the techniques presented herein enable a hardware I/O resource (e.g., queue) of a network interface card to be shared efficiently with different assignable interfaces to achieve increased resource utilization. In particular, each queue can be partitioned or mapped dynamically across different assignable interfaces, thus increasing the granularity and scalability of existing resources. For example, assuming there are 2,000 queues at a network interface card. If, through implementation of the techniques presented herein, each queue me be partitioned in three different ranges with dynamic queue depth, then those 2,000 queues can be mapped to 6,000 assignable interfaces. As a result, the direct pass through capability increases threefold.

In one example of FIG. 1, the firmware 134 receives instructions from a management device 136 to create partitions in the hardware I/O resources, such as queues 140, 142, and 144, of the network interface card 118 (e.g., a user, via the management device 136, assigns assignable interfaces to queue partitions). The OS 114 then maps the hardware I/O resources (control registers of the hardware input/output resources 135) of the network interface card 118, as instructed by the management device 136 (i.e., the firmware 134 carves out the physical resources for each assignable interface). Once a partition region is created, it is then mapped to a specific PASID based on the request from guest OS or container to the VMM.

Figure 2:
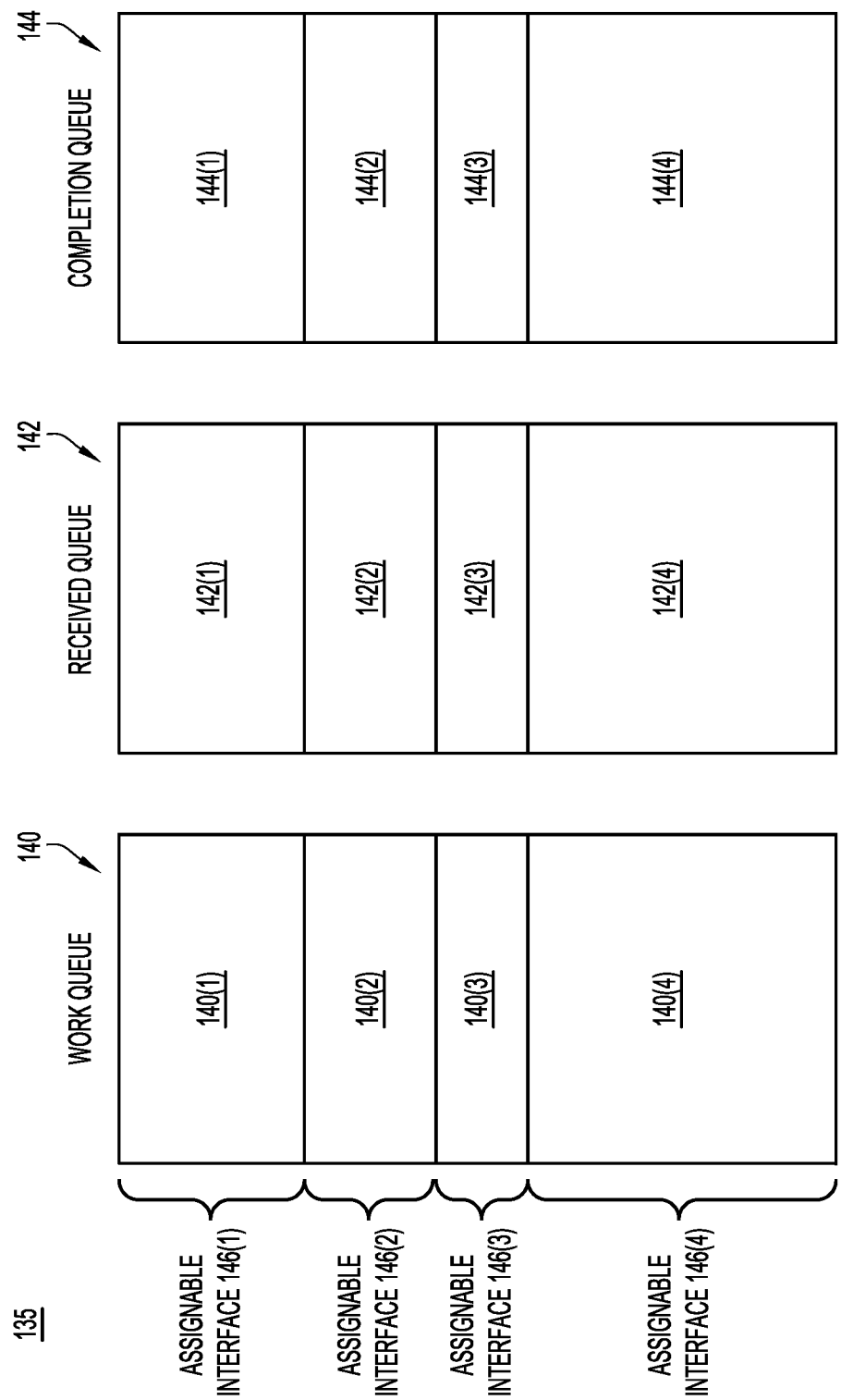
FIG. 2 is a schematic diagram illustrating the partitioning of network interface card resources, according to an example embodiment.

Referring next to FIG. 2, shown is a schematic diagram illustrating the partition of queues in accordance with embodiments presented herein. More specifically, shown in FIG. 2 is a schematic representation of a portion of a control register of hardware input/output resources 135 that includes a Work Queue 140, Receive Queue 142, and Completion Queue 144. As shown, each of the Work Queue 140, Receive Queue 142, and the Completion Queue 144 are logically segregated/partitioned into four segments/partitions, where each partition corresponds to an assignable interface and which will be provided with a unique PASID assigned by VMM to achieve address space isolation.

More specifically, assignable interface 146(1) is associated with partitions 140(1), 142(1), and 144(1) of the Work Queue 140, Receive Queue 142, and the Completion Queue 144, respectively. Assignable interface 146(2) is associated with partitions 140(2), 142(2), and 144(2) of the Work Queue 140, Receive Queue 142, and the Completion Queue 144, respectively. Assignable interface 146(3) is associated with partitions 140(3), 142(3), and 144(3) of the Work Queue 140, Receive Queue 142, and the Completion Queue 144, respectively. Finally, assignable interface 146(4) is associated with partitions 140(4), 142(4), and 144(4) of the Work Queue 140, Receive Queue 142, and the Completion Queue 144, respectively.

As noted, assignable interfaces in accordance with the techniques presented herein will be assigned a unique PASID by the host software (VMM, Guest OS or Container). As such, in the examples of FIGS. 1 and 2, the assignable interface 146(1) is associated with PASID-11 (host driver 122(1)), the assignable interface 146(2) is associated with PASID-12 (host driver 126(1)), the assignable interface 146(3) is associated with PASID-n2 (host driver 122(N)), and the assignable interface 146(4) is associated with PASID-n1 (host driver 126(N)). As described further below, in the techniques presented herein, each partition of a queue has an associated configurable ring_base, ring_size, and PASID field associated to it such that it is possible to map the assignable interfaces to the descriptors and, accordingly support multiple PASIDs (via a single queue).

As noted, the setup of the assignable interfaces and associated partitions is performed in software, where the numbers and sizes of the partitions are received from the management device 136. In general, the sizes of the partitions in a given queue do not have to be the same (i.e., management device 136 can assign different size partitions to different assignable interfaces).

Returning to the example of FIG. 1, a guest OS is able to directly write to is associated partition using the assigned PASID. For example, virtual network interface card 132(1) may issue a DMA transaction (write transaction) to the host memory, based on a higher level request initiated by the host driver 122(1), where the DMA transaction uses the assigned PASID, namely PASID-11. The hardware 116 will look up the mapping of guest physical address to a host physical address based on the PASID specific mapping table setup by the OS stack apriori and then divert the write transaction with the help of IOMMU(130) to appropriate physical address. In another example, the transactions initiated by the host processor 125(1)-125(N) to the network controller/AI will be delivered to the appropriate physical address (based on the mapping setup by host software) without any support from the firmware 134. It is also possible in some cases, the firmware 134 can be setup in such a way that the firmware 134 decodes any transaction on behalf of the assignable interface, namely assignable interface 146(1), associated with PASID-11 and redirect the transaction to the corresponding queue partitions. Stated differently, the firmware 134 performs a translation process to determine which portion of the queue to which it should be allowed to write.

The decoding is performed using the information identified in Table 1, below, which is the write transaction is diverted to the firmware 134 (i.e., so the ring base and ring size can be decoded and used to identify the correct partition). In certain examples, the ring base is given by the software for the associated assignable interface 146(1). The control registers of the hardware input/output resources 135 are then updated appropriately (e.g., the hardware 116 and the firmware 134 know which assignable interface is associated with the PASID-11 (i.e., where the host driver 122(1) wants to write) and, accordingly, which specific partition (specific section of the shared resource) should be accessed and updated).

Table 1 is a description of each field in the control registers of network interface card to support the PASID and assignable interface mappings, in accordance with embodiments presented herein.

| Register | Size | Description |
| --- | --- | --- |
| ring_base | 49 | The base address of the descriptor list. If bits [48:47] are 00 or 11, this is a host virtual address. If bits [48:47] are 10, this is a local physical address. |
| ring_size | 12 | Size of the descriptor list, in units of descriptors. |
| pasid_en | 1 | Indicates whether the PASID is enabled or not. |
| pasid | 20 | PASID for given queue's descriptor range. |
| Queue index | 12 | Indicates which queue index for which this ring is used. A Queue can be shared with multiple assignable interfaces. |
| posted_index | 64 | Writes to this register indicate that new WQ descriptors are ready to be transmitted. In addition, writes to this register may indicate the address of the associated data buffer so that local can prefetch the data in parallel with the descriptor. |
| cq_index | 10 | Number of the completion queue used by this work queue (zero based). This number is local to this vNIC, and is used by hardware to index into the completion queue array defined below. If this number is larger than the completion queue array size minus 1 for this vNIC, the last completion queue in this vNIC's array will be used. |

-continued

| Register | Size | Description |
| --- | --- | --- |
| enable | 1 | 1: Work queue is enabled, DMA operational<br>0: Work queue is disabled, DMA will stop at next packet boundary |
| running | 1 | 1: Work queue DMA engine currently has operations pending for this WQ.<br>0: Work queue DMA engine does not have operations pending for this WQ. After a WQ is disabled, the driver should poll this bit until cleared before changing any other control registers (except posted_index) or reclaiming active memory buffers. |
| fetch_index | 12 | The index which hardware is currently using. Hardware will attempt to fetch descriptors when the fetch_index != posted_index. Software must not write to this register while the WQ is enabled. |
| dca_value | 1 | When set, DCA is enabled for CQ writes. The numerical value placed in the DCA bits of the PCI-E header is specified by the PCI-E vNIC config; this bit enables DCA to be used. |
| error_interrupt_enable | 1 | Enable an interrupt to be sent on a WQ error event. WQ errors will always disable the WQ and set the error_status, bit an interrupt will be sent only if this bit is set. |
| error_interrupt_offset | 7 | Offset of this WQ's error interrupt within the vNIC's interrupt array, zero based. This number is local to this vNIC, and should not exceed the interrupt array size minus 1 for this vNIC, else it will be set to the last interrupt in this vNIC's array. This register is only 7 bits, not 11, so the error interrupt must fall within the lower 1128 interrupts for the vNIC. |
| error_status | 5 | Error code status for this WQ. Any error will cause the enable bit to clear and the status to appear in this register. The driver may then read fetch_index to determine which descriptor caused the error. A WQ will not be processed if error_status is non-zero, Even after enable is written to 1. |

Table 1, above, illustrates the concepts of the "ring base" and the "ring size." As noted, the ring base is the base address for a logical partition in a shared resource (e.g., shared queue control registers). The ring size is the size of that logical partition in the shared resource (units of descriptors). As described further below, the ring base and the ring size are the pieces of information that are used to write to the specific/discrete section of the shared resource, in response to receipt of a write transaction from a host.

In operation, the one or more processors 125(1)-125(N) are host processor cores which can initiate transaction to write/read control registers pertaining to an assignable interface, which could be a partitioned control registers allowing to program the ring_base/ring_size for that partition. The control registers are made visible to host software using BAR MAP. In certain examples, writing descriptors to partitioned ring does not utilize firmware intervention from the host as the host is aware of the mapping and can redirect to appropriate physical address which is in host memory. Initiating a read/write from Network Interface card to host memory may utilize a PASID prefix based TLP transactions to be generated by network controller on behalf of an assignable interface, in which case the IOMMU helps to resolve and redirect to the right physical host memory address based on the floated PASID.

Read transactions issued by the host driver 122(1) to the control register need not be tracked by software because there is no action happening on the registers themselves. As such, for performance reasons, read transactions are not tracked and instead handled by the hardware 116 alone.

In certain examples, transmit/receive queue control registers are modified as lookup windows each one with ring base and ring size with PASID enable field and 20-bit PASID. There are two different regions mapped as WQ/RQ control registers and associated posted index and fetch index. An advantage of decoupling queue processing indices and the control register default configuration is that it allows mapping of the control register rings per assignable interface.

In operation, the firmware 134 maps the control registers of the queue pairs to the assignable interfaces using an indirect transaction mechanism such that any write to the control register will divert the transaction to the firmware 134 through a predetermined interrupt. The firmware 134 then will analyze the field that is being operated upon and write the appropriate translated fields to the actual control register (i.e., associated queue partition). The queue processing indices (that will be updated, e.g., by the management device 136) will be mapped directly so that there is no firmware 134 interference, which reduces the performance by improving latency. Here, the fundamental assumption is that the queue control registers are updated rarely and only queue processing indices are updated in due course of the queue's life, from a host software point of view.

Additionally, when the host driver updates the ring addresses and size to the mapped to a queue, the firmware 134 programs the actual control registers in the fields given above in Table 1. Once the queue is setup, the host driver starts posting the packets to the descriptors which are residing in the host memory with appropriate posted indices. The hardware then acts on the descriptors and updates the fetch indices as it processes the queue. Here, the hardware does not have awareness that the queue is actually shared between multiple address domains (multiple PASIDS) as those details are hidden. As long as there is ring base and ring size, the hardware fetches the ring base and updates the fetch index that it's currently servicing.

Figure 3:
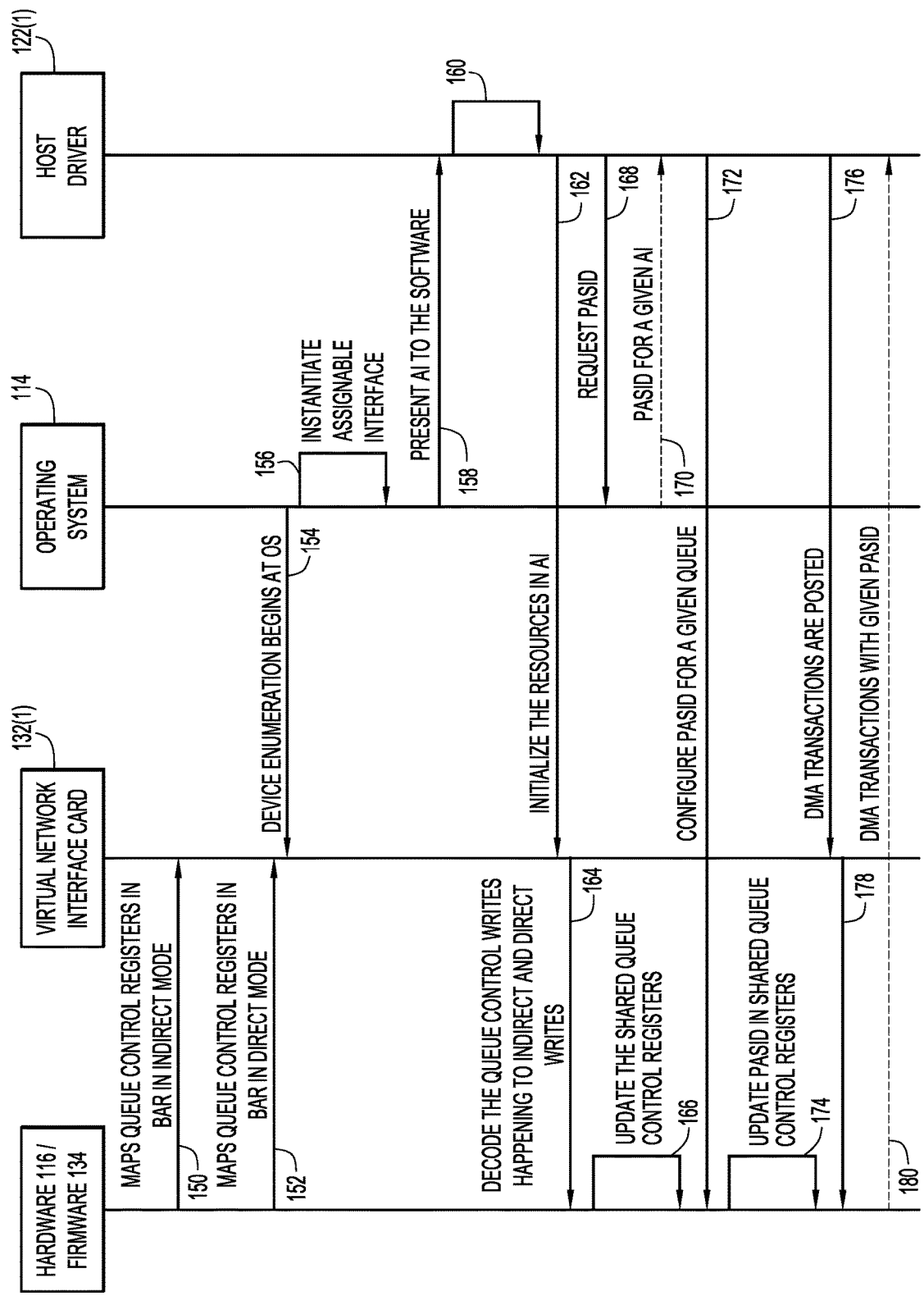
FIG. 3 is a sequence diagram illustrating operations performed for partitioning of network interface card resources, according to an example embodiment.

FIG. 3 is a ladder/sequence diagram illustrating how a queue partition is initialized and operates, in accordance with embodiments presented herein. FIG. 3 illustrates the following operational entities: hardware 116, firmware 134, a virtual network interface 132(1), operating system 114, and host driver 122(1), each as described above with reference to FIG. 1. For ease of illustration, hardware 116 and firmware 134 are shown together.

As shown by arrow 150, the flow of FIG. 3 starts when the firmware 134 maps the queue control registers in indirect mode such that any write transactions will be diverted to the firmware 134 (e.g., processors 127(1)-127(N)). In other words, the firmware 134 configures the hardware such that any write transaction going to selected control registers will generate an interrupt). As shown by arrow 152, the firmware 134 maps posted/fetch index and error registers in direct transaction mode such that these read transactions will not be intercepted/diverted (i.e., access directly by the host driver).

Once the virtual network interface card 132(1) is presented, the operating system 114 will start the device enumeration. This is shown by arrow 154. As used herein, the device enumeration means the discovery of the device (i.e., virtual network interface card 132(1)) and discovery of the associated resources. At 156, the assignable interface 146(1) is instantiated. Once the OS 114 has assigned the resources (enumeration), the assignable interface is ready (i.e., the address space is already assigned via a control mechanism).

As illustrated by arrow 158, the assignable interface 146(1) is presented to the host driver 122(1). As illustrated by arrow 160, the assignable interface 146(1) gets mapped to virtual configuration space from the OS software stack. In response, as illustrated by arrow 162, the host driver 122(1) triggers the initialization of the resources (e.g., queue pairs) with a message to the virtual network interface card 132(1). The ring base and ring size is programmed in the queue control registers of the hardware input/output resources 135.

As illustrated by arrow 164, the queue control writes are decoded (direct or indirect writes). In other words, the virtual network interface card 132(1) pushes down to the hardware/firmware, which decodes the control registers depending on direct or indirect writes. At 166, the hardware 116 and/or firmware 134 then updates the shared control registers on behalf of the host driver 122(1). The shared control registers are the partition associated with the assignable interface 146(1).

As illustrated by arrow 168, the host driver 122(1) requests a PASID for assignable interface 146(1). As illustrated by arrow 170, the operating system 114 provides the PASID for the given assignable interface 146(1). As illustrated by arrow 172, the host driver 122(1) sets the PASID and pushes it down to the firmware 134. At 174, the PASID is updated in the shared control registers of the hardware input/output resources 135.

Arrow 176 illustrates the issuance/posting of an I/O transaction by the host driver 122(1) to an assignable interface 146(1). In certain examples, a write to the control register can trigger an interrupt (e.g., assumed posted index write is indirect), represented by 178, to processors 127(1)-127(N) which then maps the appropriate values to the WQ control registers with the ring size and ring base. Arrow 180 illustrates DMA transactions with the given PASID.

As noted, direct write to the control registers is not allowed since the queue is shared between multiple assignable interfaces. A possible ring size is already communicated by the firmware 134 to the host software through predetermined software protocol. Thus, the queue gets setup in the hardware 116 as well as in the host software stack.

In certain examples, the host driver 122(1) starts posting the work/descriptors in the virtual rings and increments the posted index. A write to the posted index triggers the work for the hardware 116 in case of the transmit queue. The hardware 116 then looks at the control registers, depending upon the queue numbers to which the work is posted. The hardware 116 determines current fetch index programmed for the given queue and decodes ring base, ring size and PASID. An untranslated request is generated to the host root port with the correct ring address and PASID as TLP prefix.

The root port responds back with the data from real physical address mapped to the untranslated address.

Figure 4:
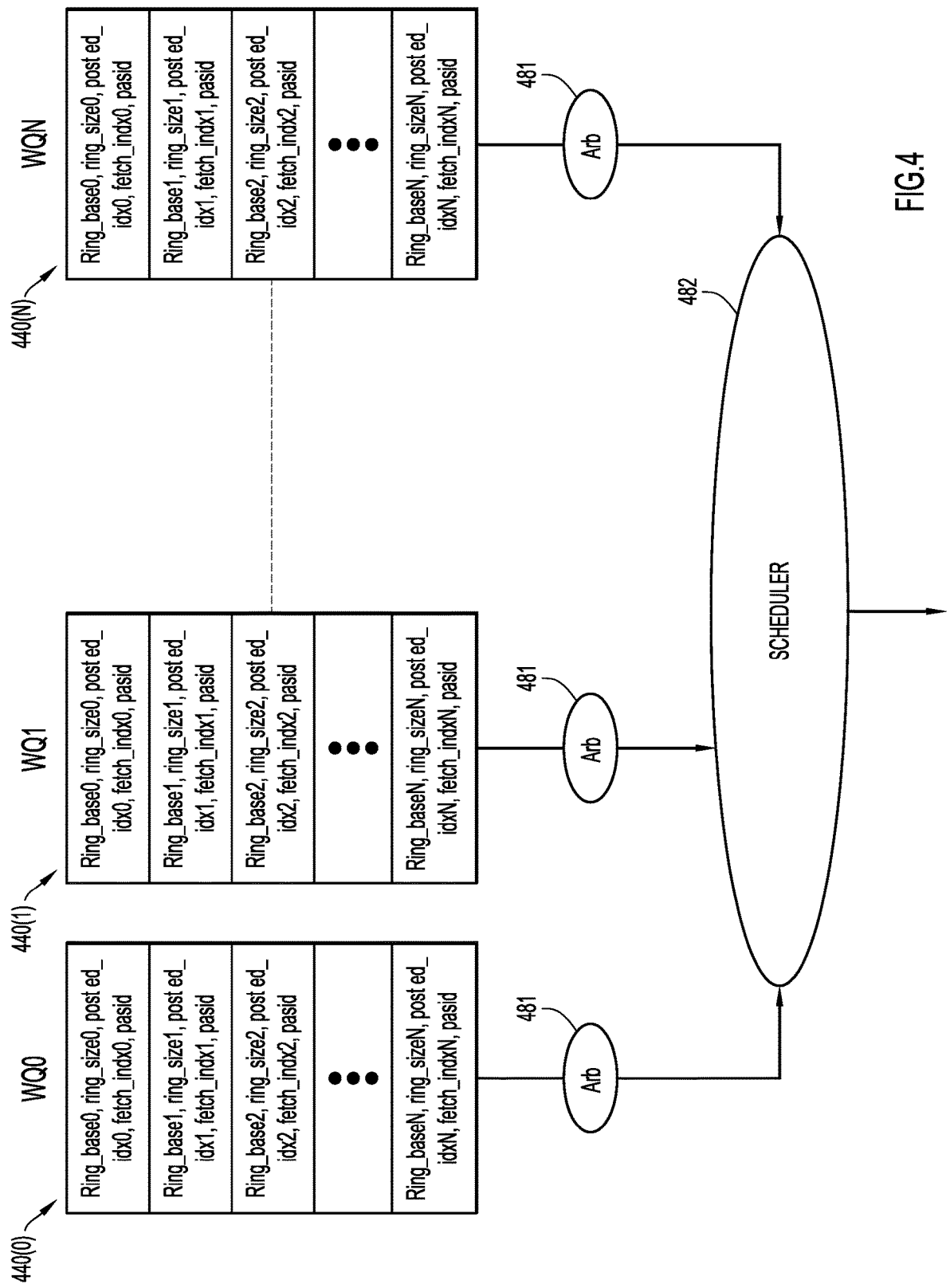
FIG. 4 is a schematic diagram illustrating scheduling operations of a network interface card, according to an example embodiment.

FIG. 4 is a schematic diagram illustrating operations of hardware scheduling and control register elements. More specifically, FIG. 4 illustrates Work Queues (WQs) 440(0)-440(N) that are each partitioned in accordance with embodiments presented herein. FIG. 4 also schematically illustrates arbitration (arbitrators 481) and scheduling (scheduler 482) of hardware, such as hardware 116.

The following is a description providing further details regarding the initialization of an assignable interface in accordance with one example presented herein. In particular, in this example, the VMM initiates a call (MACAddress, PasidEnFlag, PASID, protection flags), to allocate the number of WQs, RQs and CQs for the associated virtual network interface card functionality. There is an internal interaction with the hardware to set the forwarding table and other tables used for operation with the information provided. This returns the WQ, RQ and CQ numbers to the guest OS via the exported interface. The virtual network interface card identifier (ID) returned by this call clearly identifies the WQ, RQ, CQ allocated for this interface. This also informs the device whether PASID is enabled or not on a virtual network interface card and the PASID is provided for that Guest OS.

The output parameter the BAR Offset is also returned, where the control registers for the allocated WQ, RQ, CQ (assignable interface) are available. This BAR offset will be mapped at page boundary for the Guest OS to access with Guest Virtual Address (GVA). An init routine gets the list of interrupt resources available for the assignable interface.

The VMM sets up the BAR Offset returned (above) to be visible to the guest OS or process container, by setting up the first level or second level mapping and informs the mapping availability by using some of the yet to be developed OS API. This step assumes those APIs, when defined, will map the control portion of the BAR map for this assignable interface at some Guest Physical Address/Guest Virtual Address. The VMM also sets the interrupt remapping table to appropriately signal the guest OS or process environment when the attention is needed by the assignable interface.

Based on the above information, the host driver in the Guest OS or the process based user level host driver could initialize the rings allocated for the virtual network interface card/assignable interface and enable it for both transmission and reception.

The following is a description providing further details regarding the transmission steps with an assignable interface, in accordance with one example presented herein. In this example, if the guest OS host driver initiates any transmission of packets, it updates the WQ with the packet (in the descriptor format specified for the network interface card). Such updates of WQ descriptors are performed using Guest Virtual Address from the host driver in the guest virtual address space. However, when the ring is initialized or primed for operation, it is programmed with Guest Physical Address.

After creating the descriptor, the host driver updates the posted index on its control register which is mapped by the Guest Address Space, via the VMM. This Write transaction is a MMIO Transaction to the device. It is assumed that the mapping for such access has been already set so that final MMIO transaction is issued to the device on behalf of the PCI-E device, which is hosting this assignable interface. If it is a process container assignment, the ring base address is programmed with Guest Virtual Address that belongs to a PASID. In this case of process container assignment, the MMIO transaction initiated to update the control register is still resolved by the mapping setup, described above. Now, since the posted index is updated in the previous step, the hardware processes the descriptor.

In the case where the assignable interface is assigned to a guest OS and not to a process container within Guest OS, the device will float the Guest PA to fetch the descriptor data. In this case, the DMA transaction that is initiated will be a DMA request without address space identifier. Therefore, resolution of such address will be based on second level address translation set up for that BDF.

In the case of a process container enabled assignable interface, the device will float the Guest Virtual Address with PASID and expect the resolution of such address to be performed based on the PASID based first level address translations. In this case the DMA transaction initiated by the device will be DMA request with address space identifier.

The above step indicates how the descriptors are fetched from the ring. However, the address indicated in the descriptor as a transmission (TX) buffer will be used to obtain the actual data for packetizing. This DMA transaction also follow the same method and is able to determine the whether this transaction needs to be initiated with the PASID or without PASID, and then floats the transaction to obtain that data from host memory.

When the transmission is complete, the firmware will write the CQ directly using the Guest PA without PASID (in the case of assignable interface assigned to Guest OS without PASID) or Guest VA with PASID (in the case where assignable interface is assigned to a Process container with PASID). The hardware generates the interrupt based on the MSI-X vector configured on that BDF for that assignable interface. The VMM could remap the interrupt so that logical processor associated with that Guest OS or Process Container can be interrupted to indicate that a completion of transmission has been performed.

The following is a description providing further details regarding the reception steps with an assignable interface, in accordance with one example presented herein. In this example, each assignable interface is expected to use a different MAC address to steer the packet to an appropriate RQ. A packet addressed to the MAC address will go through the forwarding table associated with this MAC address to determine the logical interface associated with the traffic. This information will be set in the PIE headers and forwarded for onward processing in the network interface card.

Additionally, the classifier will be set for this destination MAC address. For this MAC address, the RQ # is a-priori knows for this MAC address and it is possible to fetch the RQ Base address using the same methodology used to generate the DMA addresses (with or without the PASID) and place the data received from the network wire using the Rx buffer described in the RQ descriptor. After the data is placed at the Rx buffers, the CQ entry is posted following the same methodology described for posting CQ entry in the case transmission, described above. The interrupt mechanism indicated in the transmission step is similar for the reception as well.

The following section provides an algorithm for a device initiated DMA Transaction. The key functionality is to identify the virtual network interface identifier (VNIC ID) either based on the Work Queue Number requesting this transaction for transmission of a packet, or based on the packet received on a MAC address. An implementation could identify the VNIC ID and the RQ that needs to be used for placing the received packet.

```
typedef struct PASID_info_table {
uint8_t bus;
uint8_t device:5;
uint8_t function:3;
uint8_t reserved1;
uint8_t reserved2;
uint8_t reserved3;
uint32_t pasiden:1
uint32_t passid:20
uint32_t flags:2
uint32_t reserved: 9
} pit_t;
#define PIT_BASE_ADDRESS_REG 0xABCD0000 // TBD
// This assumes the routine is called only for PCI based Host
// Transactions initiated by the device. The caller already made
// The determination to make sure this is a PCI-E transaction by checking
// the bit 48 of the untranslated address.
void
generate_pci_dma(uint64_t untranslated_address, int size, int flag,
uint16_t vnicid)
{
uint64_t pit_base_address;
pit_t *pitinfop;
pit_base_address = read_reg(PIT_BASE_ADDRESS_REG);
// Sizeof pit_t is 64 bits each entry.
pitinfop = pit_base_address + vnicid * sizeof(pit_t);
if (pitinfop->pasiden)
{
generate dma transaction with PASID TLP Prefix
using pitinfop->passID.
Generate READ/WRITE transaction (indicated by flag)
for the given size using the untranslated_address and
the BDF as the source device. It can also incorporate the requested
type of access by using information from pitinfop->flags.
} else {
generate dma transaction without PASID TLP prefix
Generate READ/WRITE transaction (indicated by flag)
for the given size using the untranslated_address and
the BDF as the source device.
}
```

Table 2, below, provides scenarios under which the above algorithm could be applied for enabling PASID with associated assignable interfaces.

TABLE 2

| Scenarios | Input Parameters | Comments |
| --- | --- | --- |
| WQ Descriptor Fetch | Based on the WQ number, the implementation could decide which VNIC ID to which that WQ belongs. Use that VNIC ID to decide whether it enables PASID by indexing to PIT and identifying the information in the PIT entry. Also if the WQ ring is located in the host memory space (validated by bit 48 of the untranslated address). | If the PASID is not enabled on that VNIC, then the DMA request will be generated without address space identifier. The BDF will be identified from the PIT. If PASID is enabled, then the DMA request is generated with address space identifier (PASID). This will also use the BDF indicated in the PIT |

TABLE 2-continued

| Scenarios | Input Parameters | Comments |
|---|---|---|
| | It should use the algorithm to generate appropriate transaction. | corresponding to the VNIC ID. This Transaction will be READ transaction. It will use the flags as is to generate the appropriate type of transaction. This can be applied for any WQ type (Ethernet, Copy, Exchange WQ etc.) |
| WQ Descriptor Pointed TX buffer address. | Input Parameters are decided using the same procedure documented for the WQ Descriptor fetch scenario. The untranslated address provided by the descriptor will be used to generate the DMA transaction with or without address space ID depending on whether PASID is enabled for that VNIC or not. | Same as above. |
| RQ Descriptor Fetch | The RQ number and VNIC ID are decided at that time of classifying a packet based on its MAC address. Based on the VNIC ID all of the decision about the descriptor are in host memory or local DDR memory can be decided. Same procedure for WQ Descriptor fetch is applied once the vnic ID, address and size have been gathered. | Same as above. This transaction will be a READ transaction. |
| RQ Descriptor pointed Rx buffer address | Same procedure as above | Same as above. This will be a write transaction. |
| Completion Entry Posting | The CQ number will identify the VNIC ID to which this belongs. After that follow the same procedure as defined in the RQ rx buffer address writes. | Same as above, This will be a Write transaction. |
| SGL Entry Addresses provided for FCoE Exchanges, handled by FC Engine | The FCoE Packet received will identify the VNIC number in the case of READ Disk I/O. In the case of Write Disk I/O the previous XFER_RDY would have posted the Exchange WQ entry, this Exchange WQ would identify the VNIC ID. Once the VNIC ID is identified and appropriate SGL entry to transfer the data, the same procedure is followed in the previous scenarios to place or fetch the data from host memory. | Same as above, depending on the type of disk I/O, it can be a READ or Write transaction to memory. |
| DMA Transactions initiated from rewrite engine | The rewrite rules are expected to identify the VNIC number. This is used for any DMA transaction to be initiated from DMA engine. Once the VNIC ID is identified, the same procedure as indicated above can be used to initiate the data placement or data fetch. | Same as above, the transaction can be read or write depending on the rewrite rules logic. |
| EDMA based Transaction generated by internal processing elements other than rewrite engine. | Same as above | Same as above, the transaction can be READ or Write depending on the application logic. |

The host can initiate configuration transactions and MMIO transactions to some BAR offsets either on behalf of the VMM or on behalf of the Guest OS or Process Container. In all cases, since the host software is responsible for setting all the mapping, it is assumed that mapping for all such transactions are appropriately set, so that the transactions would succeed.

Figure 5:
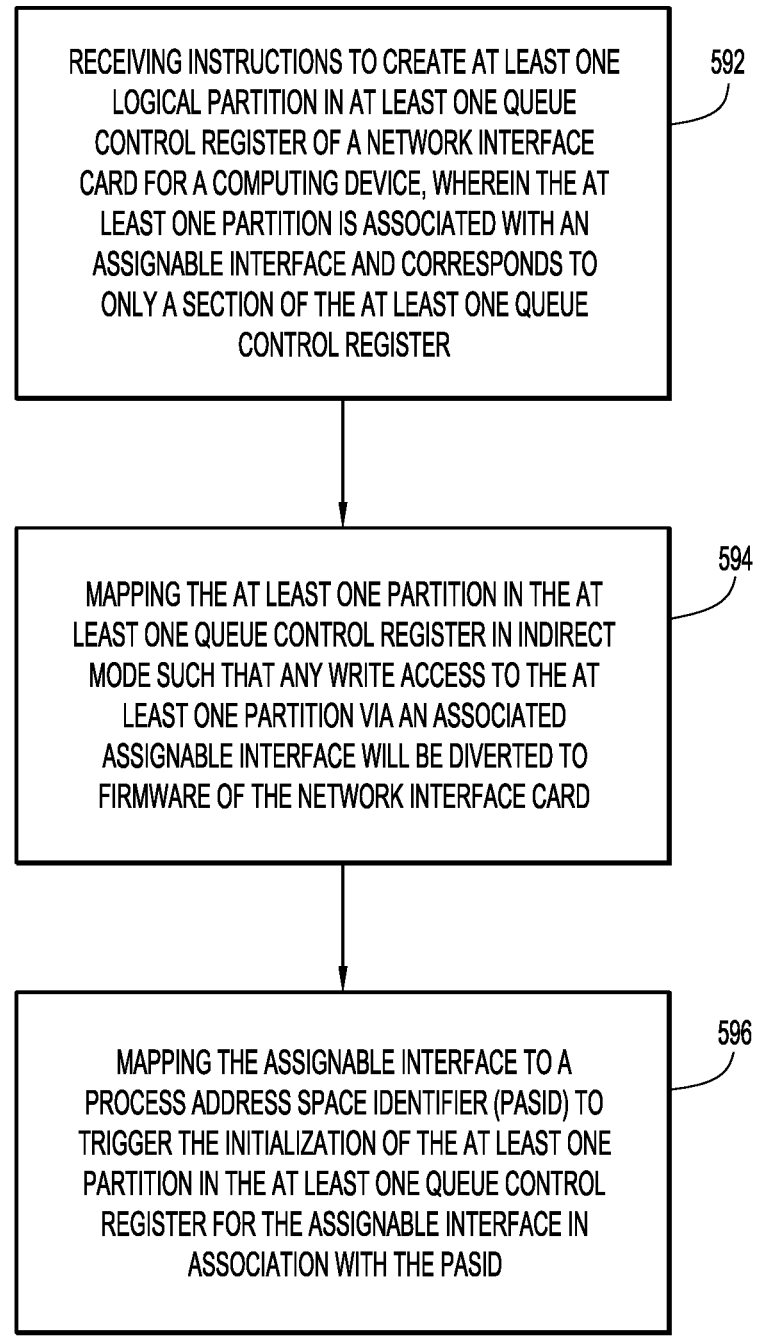
FIG. 5 is a high-level flowchart of a method, according to an example embodiment.

FIG. 5 is a high-level flowchart of a method 590 in accordance with embodiments presented herein. Method 590 begins at 592 where instructions are received to create at least one logical partition in at least one queue control register of a network interface card for a computing device. The at least one logical partition is associated with an assignable interface and corresponds to only a section of the at least one queue control register.

At 594, the at least one logical partition is mapped in the at least queue control register in indirect mode such that any write access to the at least one logical partition via an associated assignable interface will be diverted to firmware of the network interface card. In general, this mapping of a partition refers to the programming of the hardware and/or software of the computing device, including the network information card, to create/setup the logical partitions in the queue control registers for subsequent use by a host. This programming may include, for example, creation/instantiation of interrupts, tables with information as shown in Table 1, above, etc. The mapping process includes programming a ring base and ring size for the assignable interface, where the ring base and ring size identify the section of the at least one queue control register associated with the assignable interface.

At 596, the assignable interface is mapped to a Process Address Space Identifier (PASID) to trigger the initialization of the at least one logical partition in the at least one queue control register for the assignable interface in association with the PASID. In general, this mapping of a assignable interface is mapped to a PASID refers to the programming of the hardware and/or software of the computing device, including the network information card, to create/setup the association between a PASID and assignable interface, for subsequent use thereof by a host. Collectively, 594 and 596 create a mapping or relationship between a host, an assignable interface, a PASID, and the at least one logical partition of the queue control register (hardware queue). The result is that that the hosts can use the assignable interface to directly access the hardware queue partition that corresponds thereto.

In one aspect a method is provided. The method comprises: receiving instructions to create at least one logical partition in at least one queue control register of a network interface card for a computing device, wherein the at least one logical partition is associated with an assignable interface and corresponds to only a section of the at least one queue control register; mapping the at least one logical partition in the at least one queue control register in indirect mode such that any write access to the at least one logical partition via an associated assignable interface will be diverted to firmware of the network interface card; and mapping the assignable interface to a Process Address Space Identifier (PASID) to trigger initialization of the at least one logical partition in the at least one queue control register for the assignable interface in association with the PASID.

In certain examples, the instructions to create the at least one logical partition in the at least one queue control register include instructions to create a plurality of partitions in the at least one queue control register, and the method further comprises: mapping each of the plurality of partitions to the at least one queue control register, wherein each of the plurality of partitions is associated with a separate assignable interface and corresponds to independent sections of the at least one queue control register. In certain such examples, two or more of the plurality of partitions have different sizes.

In certain examples, mapping the assignable interface to the PASID to trigger the initialization of the at least one logical partition in the at least one queue control register for the assignable interface in association with the PASID, includes: programming a ring base and ring size for the assignable interface, wherein the ring base and ring size identify the section of the at least one queue control register associated with the assignable interface and PASID. In certain such examples, the method further comprises: receiving, from a host in the computing device, a write transaction directed to the assignable interface; triggering, in response to the write transaction, an interrupt to firmware of the network interface card; determining the ring base and ring size for the assignable interface; and based on the ring base and ring size, updating the at least one logical partition in the at least one queue control register based on the write transaction. In further examples, prior to receiving the write transaction directed to the assignable interface, the method comprises: communicating a ring size associated with the at least one logical partition to the host.

In certain examples, prior to programming a ring base and ring size for the assignable interface, the method comprises: performing enumeration of a virtual network interface card provided by the network interface card; instantiating the assignable interface for the virtual network interface card; presenting the assignable interface to a host in the computing device; and initiating, by the host in the computing device, resources associated with the assignable interface. In certain such examples, the method further comprises: requesting, at the host in the computing device, the PASID for the assignable interface; at the host in the computing device, receiving, from an operating system of the computing device, the PASID for the assignable interface; and configuring the PASID for the at least one logical partition in the at least one queue control register associated with the assignable interface.

In certain examples, the method further comprises: mapping posted/fetch index and error registers in direct transaction mode such that any read transactions will not diverted to firmware of the network interface card.

In certain examples, the method further comprises: receiving the instructions to create the at least one logical partition in at least one queue control register of a network interface card from a separate management device.

In another aspect, an apparatus is provided. The apparatus comprises: a network interface card configured to provide a plurality of virtual network interface cards; one or more processors configured to: receive instructions to create at least one logical partition in at least one queue control register of a network interface card for a computing device, wherein the at least one logical partition is associated with an assignable interface and corresponds to only a section of the at least one queue control register; map the at least one logical partition in the at least one queue control register in indirect mode such that any write access to the at least one logical partition via an associated assignable interface will be diverted to firmware of the network interface card; and map the assignable interface to a Process Address Space Identifier (PASID) to trigger the initialization of the at least one logical partition in the at least one queue control register for the assignable interface in association with the PASID.

In another aspect, one or more non-transitory computer readable storage media encoded with instructions are provided. The instructions, when executed by one or more processors, cause the one or more processors to: receive instructions to create at least one logical partition in at least one queue control register of a network interface card for a computing device, wherein the at least one logical partition is associated with an assignable interface and corresponds to only a section of the at least one queue control register; map the at least one logical partition in the at least one queue control register in indirect mode such that any write access to the at least one logical partition via an associated assignable interface will be diverted to firmware of the network interface card; and map the assignable interface to a Process Address Space Identifier (PASID) to trigger the initialization of the at least one logical partition in the at least one queue control register for the assignable interface in association with the PASID.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method, comprising:
receiving instructions to create at least one logical partition in at least one queue control register of a network interface card for a computing device, wherein the at least one logical partition corresponds to an assignable interface and is mapped to only a section of the at least one queue control register, and the instructions to create the at least one logical partition in the at least one queue control register include instructions to create a plurality of partitions in the at least one queue control register;
mapping the at least one logical partition in the at least one queue control register in indirect mode such that any write access to the at least one logical partition via an associated assignable interface will be diverted to firmware of the network interface card;
mapping each of the plurality of partitions to the at least one queue control register, wherein each of the plurality of partitions is associated with a separate assignable interface and corresponds to independent sections of the at least one queue control register; and
mapping the assignable interface to a Process Address Space Identifier (PASID) to trigger initialization of the at least one logical partition in the at least one queue control register for the assignable interface in association with the PASID.

2. The method of claim 1, wherein two or more of the plurality of partitions have different sizes.

3. The method of claim 1, wherein mapping the assignable interface to the PASID to trigger the initialization of the at least one logical partition in the at least one queue control register for the assignable interface in association with the PASID, includes:
programming a ring base and a ring size for the assignable interface, wherein the ring base and the ring size identify the section of the at least one queue control register associated with the assignable interface and the PASID.

4. The method of claim 3, further comprising:
receiving, from a host in the computing device, a write transaction directed to the assignable interface;
triggering, in response to the write transaction, an interrupt to firmware of the network interface card;
determining the ring base and the ring size for the assignable interface; and
based on the ring base and the ring size, updating the at least one logical partition in the at least one queue control register based on the write transaction.

5. The method of claim 4, wherein prior to receiving the write transaction directed to the assignable interface, the method comprises:
communicating the ring size associated with the at least one logical partition to the host.

6. The method of claim 3, wherein prior to programming the ring base and the ring size for the assignable interface, the method comprises:
performing enumeration of a virtual network interface card provided by the network interface card;
instantiating the assignable interface for the virtual network interface card;
presenting the assignable interface to a host in the computing device; and
initiating, by the host in the computing device, resources associated with the assignable interface.

7. The method of claim 6, further comprising:
requesting, at the host in the computing device, the PASID for the assignable interface;
at the host in the computing device, receiving, from an operating system of the computing device, the PASID for the assignable interface; and
configuring the PASID for the at least one logical partition in the at least one queue control register associated with the assignable interface.

8. The method of claim 1, further comprising:
mapping posted/fetch index and error registers in direct transaction mode such that any read transactions will not be diverted to firmware of the network interface card.

9. The method of claim 1, further comprising:
receiving the instructions to create the at least one logical partition in the at least one queue control register of the network interface card from a separate management device.

10. An apparatus comprising:
a network interface card configured to provide a plurality of virtual network interface cards;
one or more processors configured to:
receive instructions to create at least one logical partition in at least one queue control register of the network interface card for a computing device, wherein the at least one logical partition corresponds to an assignable interface and is mapped to only a section of the at least one queue control register, and the instructions to create the at least one logical partition in the at least one queue control register include instructions to create a plurality of partitions in the at least one queue control register;
map the at least one logical partition in the at least one queue control register in indirect mode such that any write access to the at least one logical partition via an associated assignable interface will be diverted to firmware of the network interface card;
map each of the plurality of partitions to the at least one queue control register, wherein each of the plurality of partitions is associated with a separate assignable interface and corresponds to independent sections of the at least one queue control register; and
map the assignable interface to a Process Address Space Identifier (PASID) to trigger initialization of the at least one logical partition in the at least one queue control register for the assignable interface in association with the PASID.

11. The apparatus of claim 10, wherein two or more of the plurality of partitions have different sizes.

12. The apparatus of claim 10, wherein to map the assignable interface to the PASID to trigger the initialization of the at least one logical partition in the at least one queue control register for the assignable interface in association with the PASID, the one or more processors are configured to:
program a ring base and a ring size for the assignable interface, wherein the ring base and the ring size identify the section of the at least one queue control register associated with the assignable interface and the PASID.

13. The apparatus of claim 12, wherein the one or more processors are configured to:

receive, from a host in the computing device, a write transaction directed to the assignable interface;

trigger, in response to the write transaction, an interrupt to firmware of the network interface card;

determine the ring base and the ring size for the assignable interface; and use the ring base and the ring size to update the at least one logical partition in the at least one queue control register based on the write transaction.

14. The apparatus of claim 13, wherein prior to receiving the write transaction directed to the assignable interface, the one or more processors are configured to:

communicate the ring size associated with the at least one logical partition to the host.

15. The apparatus of claim 12, wherein prior to programming the ring base and the ring size for the assignable interface, the one or more processors are configured to:

perform enumeration of a virtual network interface card provided by the network interface card;

instantiate the assignable interface for the virtual network interface card;

present the assignable interface to a host in the computing device; and initiate, by the host in the computing device, resources associated with the assignable interface.

16. The apparatus of claim 15, wherein the one or more processors are configured to:

request, at the host in the computing device, the PASID for the assignable interface;

at the host in the computing device, receive, from an operating system of the computing device, the PASID for the assignable interface; and configure the PASID for the at least one logical partition in the at least one queue control register associated with the assignable interface.

17. One or more non-transitory computer readable storage media encoded with instructions that, when executed by one or more processors, cause the one or more processors to:

receive instructions to create at least one logical partition in at least one queue control register of a network interface card for a computing device, wherein the at least one logical partition corresponds to an assignable interface and is mapped to only a section of the at least one queue control register, wherein the instructions to create the at least one logical partition in the at least one queue control register include instructions to create a plurality of partitions in the at least one queue control register;

map the at least one logical partition in the at least one queue control register in indirect mode such that any write access to the at least one logical partition via an associated assignable interface will be diverted to firmware of the network interface card;

map each of the plurality of partitions to the at least one queue control register such that each of the plurality of partitions is associated with a separate assignable interface and corresponds to independent sections of the at least one queue control register; and map the assignable interface to a Process Address Space Identifier (PASID) to trigger an initialization of the at least one logical partition in the at least one queue control register for the assignable interface in association with the PASID.

18. The one or more non-transitory computer readable storage media of claim 17, wherein each of the plurality of partitions is associated with a unique PASID, an associated configurable ring base, and an associated configurable ring size.

19. The one or more non-transitory computer readable storage media of claim 17, wherein two or more of the plurality of partitions have different sizes.

20. The one or more non-transitory computer readable storage media of claim 17, wherein the instructions further cause the one or more processors to:

map posted/fetch index and error registers in direct transaction mode such that any read transactions will not be diverted to firmware of the network interface card.

* * * * *